United States Patent
Evans et al.

(10) Patent No.: US 6,913,628 B2
(45) Date of Patent: Jul. 5, 2005

(54) WATERBORNE FABRIC AND TEXTILE COATING OR TREATMENT

(75) Inventors: James M. Evans, Hattiesburg, MS (US); Shelby F. Thames, Hattiesburg, MS (US)

(73) Assignee: University of Southern Mississippi, Hattiesburg, MS (US)

( * ) Notice: Subject to any disclaimer, the term of this patent is extended or adjusted under 35 U.S.C. 154(b) by 292 days.

(21) Appl. No.: 10/383,157

(22) Filed: Mar. 6, 2003

(65) Prior Publication Data

US 2003/0226211 A1 Dec. 11, 2003

Related U.S. Application Data

(60) Provisional application No. 60/362,905, filed on Mar. 8, 2002.

(51) Int. Cl.[7] ................... D06M 13/224; D06M 15/263; D06M 15/564; C08F 218/14
(52) U.S. Cl. ............................. 8/115.62; 8/181; 8/185; 8/196; 510/475; 510/476; 510/477; 252/8.61; 252/8.91; 526/128; 526/194; 526/213; 526/318; 526/318.2
(58) Field of Search ............................. 8/115, 62, 181, 8/185, 196; 510/475, 476, 477; 252/8.61, 8.91; 526/128, 194, 213, 318, 318.2

(56) References Cited

U.S. PATENT DOCUMENTS

| | | | |
|---|---|---|---|
| 4,753,992 A | 6/1988 | Umpleby | 535/100 |
| 5,171,809 A | 12/1992 | Hilty et al. | 526/279 |
| 5,770,667 A | 6/1998 | Epple et al. | 526/213 |
| 6,001,913 A | 12/1999 | Thames et al. | 524/398 |
| 6,107,418 A | 8/2000 | Mueller | 525/477 |
| 6,197,907 B1 | 3/2001 | Yoshida et al. | 526/319 |
| 6,203,720 B1 * | 3/2001 | Thames et al. | 252/182.12 |
| 6,265,028 B1 | 7/2001 | Zhao et al. | 427/372.2 |
| 2003/0226211 A1 * | 12/2003 | Evans et al. | 8/115.51 |

FOREIGN PATENT DOCUMENTS

| EP | WO 03/076709 | * | 9/2003 | ........ D06M/13/224 |
|---|---|---|---|---|

* cited by examiner

*Primary Examiner*—Brian P. Mruk
(74) *Attorney, Agent, or Firm*—Howrey LLP

(57) ABSTRACT

Novel waterborne vinyl copolymer dispersions useful as a fabric coating or treatment to improve the performance properties of textile products are disclosed and claimed. The compositions contain vinyl monomers, a vinyl silane and hydroxy fatty acid ester compounds having at least one double bond in their backbone featuring internally plasticizable and crosslinkable properties.

12 Claims, No Drawings

WATERBORNE FABRIC AND TEXTILE COATING OR TREATMENT

This application claims the benefit of U.S. Provisional Application No. 60/362,905 filed Mar. 8, 2002.

BACKGROUND OF THE INVENTION

1. Field of the Invention

This invention relates to novel waterborne copolymer dispersions produced by emulsion polymerization useful as a fabric coating or treatment to improve the performance properties of textile products. The new compositions contain at least one vinyl monomer, a vinyl silane and an ethylenically unsaturated carboxylic ester derived from hydroxy fatty acid esters having at least one double bond in their backbone. The invention is also directed to the method of using the waterborne vinyl copolymer dispersion as a coating to improve the performance properties of textile products.

2. Description of the Prior Art

Coatings are applied to fabrics and textiles to enhance their characteristics such as wearability, soil and water resistance, stain resistance and to make them wrinkle proof. Numerous processes and compositions are known to those of skill in the art.

Previously available fabric treatments fail to provide the wrinkle resistance, soil and water resistance, and wear resistance needed in more demanding end use applications for clothing, furniture and other textile products.

Accordingly, it would be an advancement in the art to provide a waterborne fabric treatment to enhance the performance of textile products.

SUMMARY OF THE INVENTION

The present invention provides a copolymer that is suitable for treating fabrics and textiles comprising an aqueous dispersion of:

a polymer obtained by the polymerization of:

(i) an internally plasticizing and crosslinkable monomer derived from a semi- or non-drying oil; and (ii) one or more of ethylenically unsaturated monomers copolymerizable therewith; and (iii) a vinyl silane.

In further aspects of this invention novel methods of treating fabrics using the above mentioned compositions are also provided.

DETAILED DESCRIPTION OF THE INVENTION

The plasticizing and crosslinkable monomers suitable for forming the compositions of this invention are derivatives of semi- or non-drying oils having an ethylenically unsaturated ester of a long-chain olefinic compound. Preferred monomers of this invention are acrylate or methacrylate esters of long-chain olefinic monomers derived (or obtained) from either castor oil or lesquerella oil.

The preferred internally plasticizing and crosslinkable monomers derived from semi- or non-drying oils of the present invention are substituted ethylenically unsaturated carboxylic acid esters of long-chain olefinic compounds of the formula I:

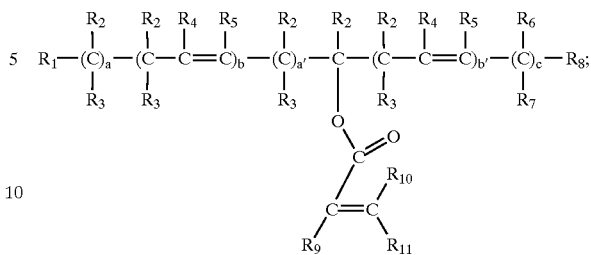

wherein (a) $R_1$, $R_2$, $R_3$, $R_4$, $R_5$, $R_6$, and $R_7$, are the same or different and are each independently selected from the group consisting of:

hydrogen;

alkoxy group having 1 to 10 carbon atoms;

alkoxyalkyl group having 1 to 10 carbon atoms; and linear or branched alkyl and fluoroalkyl groups having the formula $C_nH_xF_y$, where n is an integer from 1 to 10, x and y are integers from 0 to 2n+1, and the sum of x and y is 2n+1;

(b) $R_8$ is selected from the group consisting of:

—CN;

—COOR;

—$CH_2OH$;

—$CH_2OR$;

—CONR'R''; and

—$CH_2NR'R''$;

where (i) R is selected from the group consisting of:

phenyl and substituted phenyl;

tolyl and substituted tolyl;

benzyl and substituted benzyl;

alkoxyalkyl group having 1 to 10 carbon atoms;

hydroxyalkyl group having 1 to 10 carbon atoms;

acyloxyalkyl group having 1 to 10 carbon atoms;

a linear or branched alkenyl group having 2 to 10 carbon atoms;

linear or branched alkyl and fluoroalkyl groups having the formula $C_nH_xF_y$, where n is an integer from 1 to 10, x and y are integers from 0 to 2n+1, and the sum of x and y is 2n+1; and a multifunctional moiety having the structure II or III:

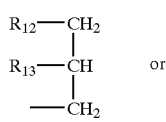

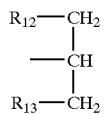

where $R_{12}$ and $R_{13}$ are the same or different and are independently selected from the group consisting of:

a substituted or unsubstituted, saturated or unsaturated fatty acid chain;

acrylic and substituted acrylic;

a linear or branched alkyl or alkenyl carboxylic acid moiety having 2 to 30 carbon atoms; and monoalkyl esters of maleic and fumaric acids, where alkyl group contains 1 to 4 carbon atoms;

(ii) R', and R" are the same or different and are independently selected from the group consisting of:

hydrogen;

phenyl and substituted phenyl;

tolyl and substituted tolyl;

benzyl and substituted benzyl;

alkoxyalkyl group having 1 to 10 carbon atoms;

hydroxyalkyl group having 1 to 10 carbon atoms;

acyloxyalkyl group having 1 to 10 carbon atoms;

a linear or branched alkenyl group having 2 to 10 carbon atoms; and linear or branched alkyl and fluoroalkyl groups having the formula $C_nH_xF_y$, where n is an integer from 1 to 10, x and y are integers from 0 to 2n+1, and the sum of x and y is 2n+1;

(c) $R_9$, $R_{10}$, and $R_{11}$ are the same or different and are independently selected from the group consisting of:

hydrogen;

a carboxylate of the formula —COOR, where R is alkyl group having 1 to 10 carbon atoms, or phenyl and substituted phenyl;

phenyl and substituted phenyl;

tolyl and substituted tolyl;

benzyl and substituted benzyl;

a linear or branched alkenyl group having 2 to 10 carbon atoms; and linear or branched alkyl and fluoroalkyl groups having the formula $C_nH_xF_y$, where n is an integer from 1 to 10, x and y are integers from 0 to 2n+1, and the sum of x and y is 2n+1; and (d) a, a', b, b', and c, are integers, where a and a' have a value of from 0 to 10, b and b' have a value of 0 to 2 with the proviso that sum of b and b' is 1 or 2, and c has a value of from 0 to 20.

These monomers are described in greater detail in U.S. Pat. No. 6,203,720 B1, the disclosure of which is incorporated herein by reference.

In another specific embodiment of this invention, the internally plasticizing and crosslinkable monomer is derived (or obtained) from a non-drying oil having a substituted ethylenically unsaturated carboxylic acid ester of a long-chain, olefinic ester of the formula IV.

The preferred copolymerizable monomers in this embodiment may be selected from the group consisting of vinyl acetate, vinyl chloride, vinyl ester of versatic acid, acrylonitrile, acrylamide, 2-ethylhexyl acrylate, 2-ethylhexyl methacrylate, 2-hydroxyethyl acrylate, 2-hydroxyethyl methacrylate, glycidyl acrylate, glycidyl methacrylate, acrylic acid, butyl acrylate, butyl methacrylate, methyl methacrylate, methyl acrylate, and styrene.

The starting materials for the preferred long-chain olefinic ester IV in the above embodiment are derived (or obtained) from either castor oil or lesquerella oil, or the transesterified product obtained from either castor oil or lesquerella oil with methanol. Thus, the long-chain olefinic ester IV may be formed from appropriate starting material by subjecting it to suitable esterification reaction as described below.

Thus, the preferred starting material for the formation of IV may be selected from the group consisting of castor oil, lesquerella oil, transesterified product of castor oil with methanol, transesterified product of lesquerella oil with methanol, methyl ricinoleate, and methyl lesquerolate. Accordingly, the products formed from these starting materials which are the preferred long-chain olefinic esters IV are acrylate ester of methyl ricinoleate, methacrylate ester of methyl ricinoleate, acrylate ester of methyl lesquerolate, and methacrylate ester of methyl lesquerolate.

Copolymerizable monomers that contain at least one ethylenically unsaturated polymerizable group referred to hereinabove are any of the well known monomers which contain at least one ethylenically unsaturated polymerizable group per molecule and are copolymerizable with the other monomers. Examples of such monomers are acrylic and methacrylic esters wherein the ester group contains 1 to about 20 carbon atoms, e.g., methyl acrylate, methyl methacrylate, ethyl acrylate, ethyl methacrylate, isopropyl acrylate, isopropyl methacrylate, butyl acrylate, butyl methacrylate, 2-ethylhexyl methacrylate, decyl acrylate, lauryl methacrylate, benzyl acrylate, and the like. Esters of various other unsaturated acids include butyl fumarate, octyl fumarate, butyl maleate, and octyl maleate.

Other acrylic or methacrylic esters which can be used in this invention are multifunctional acrylates or methacrylates, and includes, for example, propylene glycol monoester of acrylic acid, propylene glycol monoester of methacrylic acid, ethylene glycol monoester of acrylic acid, ethylene glycol monoester of methacrylic acid, glycidyl acrylate, glycidyl methacrylate, hydroxyethyl acrylate, hydroxyethyl methacrylate, and hexanediol diacrylate.

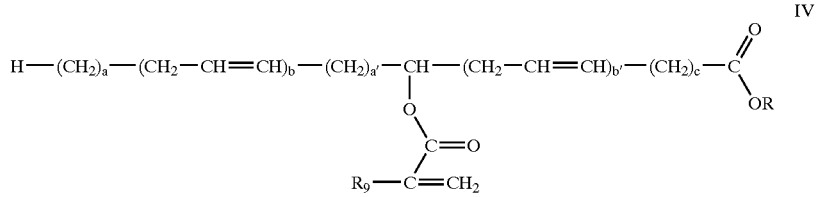

IV

Where R and $R_9$ are as defined above, however, preferably R is either methyl or multifunctional moieties II or III. Preferred $R_9$ is either hydrogen or methyl, i.e., ethylenically unsaturated ester in this preferred embodiment is either acrylic or methacrylic ester a, a', b, b', and c, in structure IV are integers, where a and a' have a value of from 2 to 4, b and b' have a value of 0 to 2 with the proviso that sum of b and b' is 1 or 2, and c has a value of 5 to 12.

Other copolymerizable monomers are vinyl aromatic monomers, such as styrene, para-acetoxystyrene, vinyl toluene, alpha methyl styrene, vinyl pyridine and the like as well as nitriles and amides, e.g., acrylonitrile and acrylamide. Other olefinic monomers such as ethylene, propylene, and butadiene are also suitable comonomers for this invention.

Additional copolymerizable monomers that can be used in this invention are the derivatives of the hypothetical vinyl alcohol, i.e., aliphatic vinyl esters such as vinyl formate, vinyl acetate, vinyl propionate, vinyl butyrate, vinyl heptanoate, vinyl pelargonate, vinyl 3,6-dioxaheptanoate, vinyl 3,6,9-trioxaundecanoate, the vinyl ester of $C_5$–$C_{12}$ saturated, teriary, branched carboxylic acids, vinyl esters of neo acids and the like. Other vinyl monomers such as vinyl chloride, vinyl sulfonate, vinyl silanes, and vinylidene chloride are also suitable comonomers.

Vinyl silane monomers that can be used in the copolymer of the present invention include vinyltriisopropoxysilane, gamma-methacryloxypropyltriisopropoxysilane, vinyltrimethoxysilane, gamma-methacryloxypropyltrimethoxysilane, and vinyltrimethoxysilane.

As mentioned hereinabove, the compositions of this invention can be used to form solvent-free coatings for fabrics and textiles. Fabrics or textiles coated with the compositions of this invention are more wrinkle proof, soil and water resistant, and wear resistant.

The fabric treatment method can include spray, dip, rollcoat, or any other coating process for fabric or textiles.

This invention is further illustrated by the following examples which are provided for illustration purposes and in no way limit the scope of the present invention.

EXAMPLE 1

A typical formula for the waterborne vinyl copolymer is as follows:

| Component | Weight percent |
| --- | --- |
| Butyl acrylate | 37 |
| methyl methacrylate | 35 |
| hydroxy ethylacrylate | 5 |
| vinyltriisopropoxysilane | 10 |
| castor oil macromonomer CAM-II (3.1)[1] | 10 |
| methacrylic acid | 3 |
| Total | 100 |

[1]CAM-II(3.1) can be formed by charging castor oil (250 gm), acrylic acid (60 gm), cyclohexane (75 gm), and hydroquinone (0.29 gm) to a 500 cc round bottom flask equipped with an electric stirrer and Dean-Stark trap. Sulfuric acid (7.5 gm) is added dropwise to the flask and the mixture is reflexed for 5 hours at 98° C.

This copolymer is dispersed in an aqueous solution and is applied to fabrics and other textiles. Additional fabric treatments such as urea formaldehyde resin, melamine formaldehyde resin, benzoguanamine formaldehyde resin, and their methoxy derivatives can also be included in the solution.

What is claimed is:

1. A compound suitable for forming fabric coatings comprising the reaction product of at least one copolymerizable monomer, a copolymerizable silane monomer, and a derivative of a non-drying oil having a substituted ethylenically unsaturated carboxylic acid ester of a long-chain olefinic moiety of the formula:

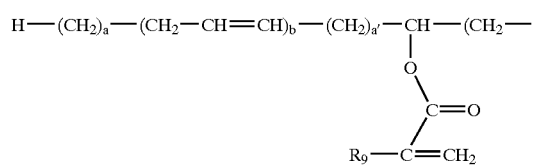

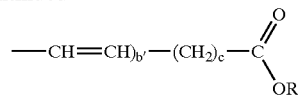

wherein (a) R is selected from the group consisting of:
phenyl and substituted phenyl;
tolyl and substituted tolyl;
benzyl and substituted benzyl;
alkoxyalkyl group having 1 to 10 carbon atoms;
hydroxyalkyl group having 1 to 10 carbon atoms;
acyloxyalkyl group having 1 to 10 carbon atoms;
a linear or branched alkenyl group having 2 to 10 carbon atoms; and
linear or branched alkyl and fluoroalkyl groups having the formula $C_nH_xF_y$,
where n is an integer from 2 to 10, x and y are integers from 0 to 2n+1, and the sum of x and y is 2n+1;

(b) $R_9$ is either hydrogen or methyl; and (c) a, a', b, b', and c are integers, where a and a' have a value of from 2 to 4, b and b' have a value of 0 to 2 with the proviso that sum of b and b' is 1 or 2, and c has a value of 5 to 12.

2. The compound of claim 1 wherein said long-chain olefinic moiety is derived from either castor oil or lesquerella oil.

3. The compound of claim 1 wherein the silane monomer is selected from the group consisting of vinyltriisopropoxysilane, gamma-methacryloxypropyltriisopropoxysilane, vinyltrimethoxysilane, gamma-methacryloxypropyltrimethoxysilane, and vinyltrimethoxysilane.

4. The compound of claim 1 wherein the copolymerizable monomer is selected from the group consisting of methyl acrylate, methyl methacrylate, ethyl acrylate, ethyl methacrylate, isopropyl acrylate, isopropyl methacrylate, butyl acrylate, butyl methacrylate, 2-ethylhexyl methacrylate, decyl acrylate, lauryl methacrylate, benzyl acrylate, vinyl formate, vinyl acetate, vinyl propionate and vinyl butyrate.

5. A composition suitable for forming fabric coatings comprising a mixture of a compound as defined in claim 1 and a urea formaldehyde resin.

6. A composition suitable for forming fabric coatings comprising a mixture of a compound as defined in claim 1 and a melamine formaldehyde resin.

7. A process for treating a fabric to enhance its performance comprising applying a vinyl copolymer to said fabric, said vinyl copolymer comprising the reaction product of at least one copolymerizable monomer, a copolymerizable silane monomer, and a derivative of a non-drying oil having a substituted ethylenically unsaturated carboxylic acid ester of a long-chain olefinic moiety of the formula:

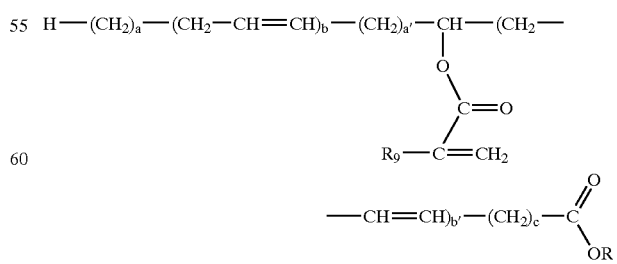

wherein (a) R is selected from the group consisting of:
phenyl and substituted phenyl;

tolyl and substituted tolyl;
benzyl and substituted benzyl;
alkoxyalkyl group having 1 to 10 carbon atoms;
hydroxyalkyl group having 1 to 10 carbon atoms;
acyloxyalkyl group having 1 to 10 carbon atoms;
a linear or branched alkenyl group having 2 to 10 carbon atoms; and
linear or branched alkyl and fluoroalkyl groups having the formula $C_nH_xF_y$,
where n is an integer from 2 to 10, x and y are integers from 0 to 2n+1, and the sum of x and y is 2n+1;

(b) $R_9$ is either hydrogen or methyl; and (c) a, a', b, b', and c are integers, where a and a' have a value of from 2 to 4, b and b' have a value of 0 to 2 with the proviso that sum of b and b' is 1 or 2, and c has a value of 5 to 12.

8. The process of claim 7 wherein said long-chain olefinic moiety is derived from either castor oil or lesquerella oil.

9. The process of claim 7 wherein the silane monomer is selected from the group consisting of vinyltriisopropoxysilane, gamma-methacryloxypropyltriisopropoxysilane, vinyltrimethoxysilane, gamma-methacryloxypropyltrimethoxysilane, and vinyltrimethoxysilane.

10. The process of claim 7 wherein the copolymerizable monomer is selected from the group consisting of methyl acrylate, methyl methacrylate, ethyl acrylate, ethyl methacrylate, isopropyl acrylate, isopropyl methacrylate, butyl acrylate, butyl methacrylate, 2-ethylhexyl methacrylate, decyl acrylate, lauryl methacrylate, benzyl acrylate, vinyl formate, vinyl acetate, vinyl propionate and vinyl butyrate.

11. A process for treating a fabric to enhance its performance comprising applying a mixture of a compound as defined in claim 1 and urea formaldehyde resin to said fabric.

12. A process for treating a fabric to enhance its performance comprising applying a mixture of a compound as defined in claim 1 and melamine formaldehyde resin to said fabric.

* * * * *